M. B. JOHNSON.
EAR CORN PARER.
APPLICATION FILED APR. 29, 1909.
935,517.
Patented Sept. 28, 1909.
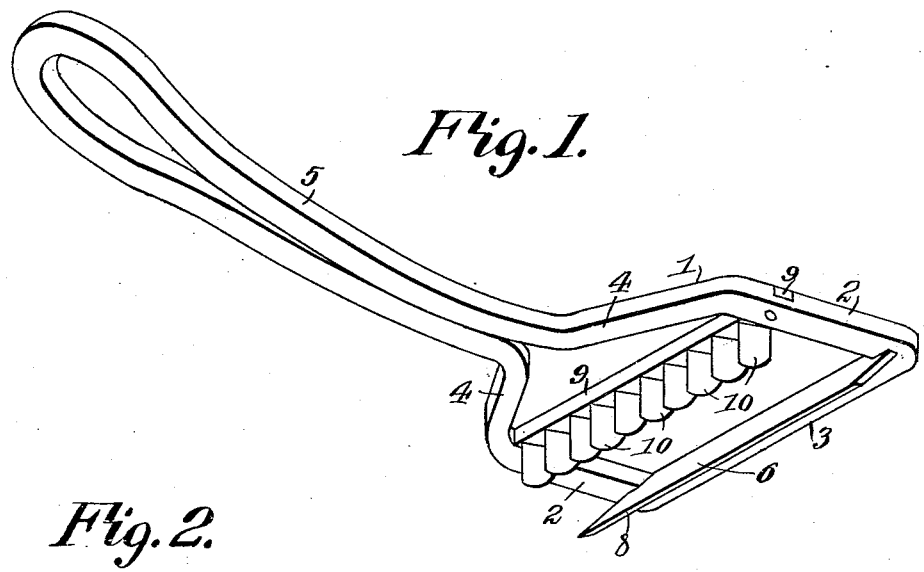
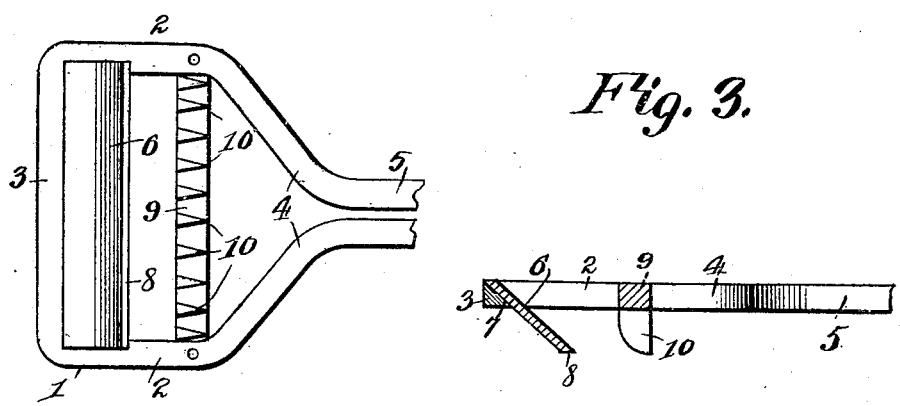
Inventor
Margaret Blanche Johnson.
Witnesses
William C. Linton.
By Victor J. Evans
Attorney

UNITED STATES PATENT OFFICE.

MARGARET BLANCHE JOHNSON, OF ALABAMA CITY, ALABAMA.

EAR-CORN PARER.

935,517.  Specification of Letters Patent.  Patented Sept. 28, 1909.

Application filed April 29, 1909. Serial No. 492,963.

*To all whom it may concern:*

Be it known that I, MARGARET BLANCHE JOHNSON, a citizen of the United States, residing at Alabama City, in the county of Etowah and State of Alabama, have invented new and useful Improvements in Ear-Corn Parers, of which the following is a specification.

This invention relates to ear corn parers, and has for an object to provide a device of this character that will be extremely simple in construction and will consist of a series of shredding knives or blades arranged forwardly of a stripping knife or blade which extends at right angles to the said shredding knives so as to follow directly behind the shredding knives, thus providing means whereby in a single operation the grains of the corn will be shredded and afterward entirely removed from the ear by the stripping knife.

Other objects and advantages will be apparent as the nature of the invention is better set forth, and it will be understood that changes within the scope of the claim may be resorted to without departing from the spirit of the invention.

In the drawing, forming a portion of this specification and in which like numerals of reference indicate similar parts in the several views:—Figure 1 is a perspective view of the parer looking toward the under side thereof. Fig. 2 is a bottom plan view of a portion of the parer. Fig. 3 is a detail longitudinal section through a portion of the parer. Fig. 4 is a detail transverse section taken through one of the shredding knives or blades.

Referring now more particularly to the drawing, there is shown an ear corn parer comprising a head 1 of hollow form preferably formed from a single piece of metal to provide parallel spaced side arms 2, a connecting end portion 3 and inwardly and angularly extending portions 4 which are extended into a loop 5 forming a handle for the device. The head 1 is provided with a stripping blade or knife 6 secured to the diagonal face 7 upon the inner side of the connecting portion 3 of the head so that the said blade extends approximately at an obtuse angle to the said connecting portion 3. The blade or knife 6 can be of any suitable form but is preferably of the form shown and is provided with a beveled lower edge 8 to facilitate the cutting action of the blade. Forwardly of the stripping blade 6 is a member 9 connected at its ends to the arms 2 and disposed in spaced relation to the stripping blade. The member 9 carries a series of vertically extending and downwardly directed shredding knives 10 which are spaced from each other and in horizontal section each of the said stripping knives or blades is of V-form to provide a vertical cutting edge 11.

The loop or handle portion 5 is bent upwardly and outwardly at an angle, as shown, away from the head 1 so that the hand of the operator when the device is in use can be held out of contact with the ear of corn to be operated upon and also allows the knives or blades 10 and the blade or knife 6 to effectively engage the ear as will be readily understood.

In operation, the device is engaged with the ear of corn and is moved longitudinally thereon, in which movement the knives 10 which will be the first to operate upon the grains will effectively shred them, and in view of the location of the blade or knife 6 with respect to the blades or knives 10 it is obvious that after the corn is shredded it will be removed entirely from the ear by said blade 6.

The device is extremely simple in construction, may be manufactured at a relatively low figure and effectively serves the purpose set forth.

I do not embody any particular instrument or tool for holding an ear of corn during the operation of the parer, but it is preferable to engage with the ear at one end an awl or similar instrument so that the ear can be conveniently held.

I claim:—

A device of the class described comprising a handle formed from a single piece of metal and provided with a hollow rectangular head at one end, a member extending transversely of the head and provided with a plurality of shredding knives extending at right angles to the plane of the head, said head having a downwardly and inwardly inclined face forwardly of the said member, and a stripping blade secured to the said inclined face of the head.

In testimony whereof I affix my signature in presence of two witnesses.

MARGARET BLANCHE JOHNSON.

Witnesses:
G. R. WATSON,
A. L. WRIGHT.